(12) United States Patent
Aono et al.

(10) Patent No.: US 10,320,327 B1
(45) Date of Patent: Jun. 11, 2019

(54) POWER STORAGE POWER CONDITIONER

(71) Applicant: OMRON Corporation, Kyoto (JP)

(72) Inventors: Kunio Aono, Hirakata (JP); Kazumi Tsuchimichi, Kyoto (JP); Kotaro Nakamura, Kusatsu (JP); Atsuo Minato, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/129,814

(22) Filed: Sep. 13, 2018

(30) Foreign Application Priority Data

Nov. 29, 2017 (JP) .................... 2017-229668

(51) Int. Cl.
*H02S 40/32* (2014.01)
*H02M 7/48* (2007.01)
(Continued)

(52) U.S. Cl.
CPC .............. *H02S 40/32* (2014.12); *H02J 3/383* (2013.01); *H02J 3/46* (2013.01); *H02M 7/4807* (2013.01); *H02S 40/38* (2014.12); *H02M 7/757* (2013.01)

(58) Field of Classification Search
CPC ....... H02M 2001/0067; H02M 7/4807; H02M 7/66; H02M 7/757; H02M 7/75; H02M 7/79; H02M 7/797; Y02B 70/1441; Y02B 70/30; H02J 3/383; H02J 3/46; H02S 40/32; H02S 40/38
See application file for complete search history.

(56) References Cited

U.S. PATENT DOCUMENTS 9,236,790 B2 * 1/2016 Inakagata ............... H02M 1/10
2008/0129120 A1 * 6/2008 Su ........................... H02J 9/062
307/80
(Continued)

FOREIGN PATENT DOCUMENTS

JP 2002116830 4/2002
JP 2009089541 4/2009
(Continued)

OTHER PUBLICATIONS

"Office Action of Taiwan Counterpart Application," dated Feb. 13, 2019, with English translation thereof, p. 1-p. 10.

*Primary Examiner* — Adolf D Berhane
*Assistant Examiner* — Shahzeb K Ahmad
(74) *Attorney, Agent, or Firm* — JCIPRNET (57) ABSTRACT

A power storage power conditioner includes an input part, a voltage-transforming part, a first input-output part, a converting part and a second input-output part. The voltage-transforming part transforms the voltage of DC power from the input part and the converting part into a second predetermined voltage. The first input-output part outputs the DC power of the voltage-transforming part to a battery unit, and inputs DC power from the battery unit. The voltage-transforming part transforms a voltage of the DC power from the first input-output part into a third predetermined voltage. The converting part converts the DC power from the input part and the voltage-transforming part into AC power. The second input-output part outputs the AC power to a power system or a load, and inputs AC power from the power system. The converting part converts the AC power from the second input-output part into DC power.

3 Claims, 5 Drawing Sheets

(51) Int. Cl.
*H02J 3/46* (2006.01)
*H02J 3/38* (2006.01)
*H02S 40/38* (2014.01)
*H02M 7/757* (2006.01)

(56) References Cited

U.S. PATENT DOCUMENTS

2017/0187190 A1\* 6/2017 Asano ................. H02J 3/383
2018/0013291 A1\* 1/2018 Ohashi ................ H02J 3/32
2018/0191236 A1\* 7/2018 Wagoner ............. H02M 1/126
2018/0233914 A1\* 8/2018 Miki .................... H02J 3/00

FOREIGN PATENT DOCUMENTS

| JP | 2012139019 | 7/2012 |
| JP | 2012222908 | 11/2012 |
| TW | I558052 | 11/2016 |

\* cited by examiner

POWER STORAGE POWER CONDITIONER

CROSS-REFERENCE TO RELATED APPLICATION

This application claims the priority benefit of Japan Application No. 2017-229668, filed on Nov. 29, 2017. The entirety of the above-mentioned patent application is hereby incorporated by reference herein and made a part of this specification.

BACKGROUND

Technical Field

The disclosure relates to a power storage power conditioner.

Description of Related Art

A power conditioner that boosts the voltage of direct current (DC) power obtained by a solar cell by a DC/DC converter, converts the DC power into alternating current (AC) power, and then outputs the AC power to a power system is known (for example, Patent Document 1: Japanese Laid-Open No. 2009-089541). A hybrid power conditioner (for example, Patent Document 2: Japanese Laid-Open No. 2012-222908) capable of converting power obtained by a solar cell array into AC power, supplying the AC power to an AC load (an electric product) and/or a power system, and charging surplus power to a battery has been put to practical use.

Figure 5:
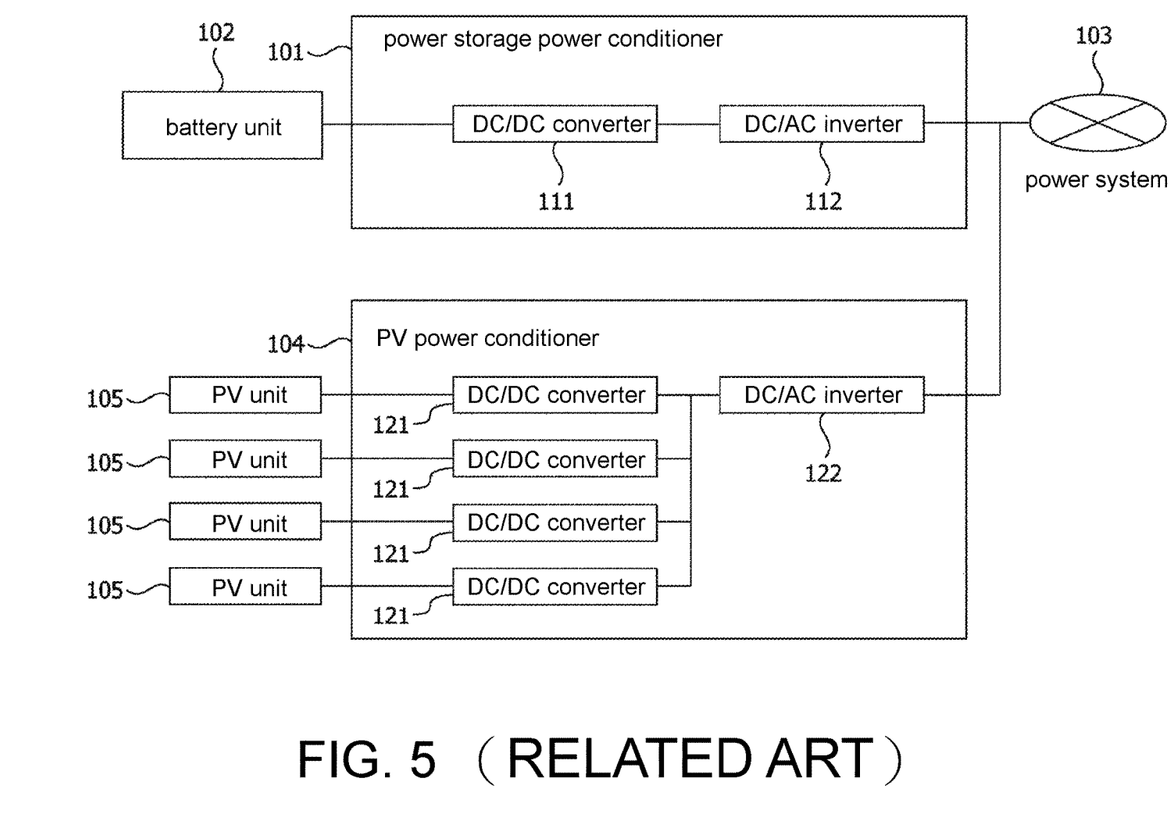
FIG. 5 is a configuration diagram of a conventional power storage system.

FIG. 5 is a configuration diagram of a conventional power storage system. A battery unit 102 and a power system 103 are connected to a power storage power conditioner 101. A plurality of PV (photovoltaic, solar power generation) units 105 and the power system 103 are connected to a PV power conditioner 104. The power storage power conditioner 101 includes a DC/DC converter 111 for boosting the voltage of DC power output from the battery unit 102, and a DC/AC inverter 112 for converting the DC power input from the DC/DC converter 111 into AC power and outputting the AC power to the power system 103. The PV power conditioner 104 includes DC/DC converters 121 for boosting the voltage of the DC power output from the PV units 105, and a DC/AC inverter 122 for converting the DC power input from the DC/DC converters 121 into AC power and outputting the AC power to the power system 103.

The need for adding the power storage power conditioner 101 to the existing PV power conditioner 104 is increasing. Also, there are needs of adding the PV power conditioner 104 to the existing power storage power conditioner 101. If the power storage power conditioner 101 and the PV power conditioner 104 are both installed, the DC/AC inverter 112 of the power storage power conditioner 101 and the DC/AC inverter 122 of the PV power conditioner 104 overlap. Therefore, the cost becomes higher and the installation area of the power storage power conditioner 101 and the PV power conditioner 104 becomes larger. In view of this situation, the disclosure aims to reduce the cost and the size and increase the conversion efficiency of the power storage system.

SUMMARY

According to an embodiment of the disclosure, a power storage power conditioner is provided. The power storage power condition includes an input part, a voltage-transforming part, a first input-output part, a converting part, and a second input-output part. Direct current (DC) power of a first predetermined voltage is input to the input part. The voltage-transforming part transforms the first predetermined voltage of the DC power input to the input part into a second predetermined voltage. The first input-output part outputs the DC power transformed into the second predetermined voltage to a battery unit, and inputs DC power from the battery unit. The converting part converts the DC power input to the input part into alternating current (AC) power. The second input-output part outputs the AC power to a power system or a load, and receives AC power from the power system. The converting part converts the AC power input to the second input-output part into DC power. The voltage-transforming part transforms a voltage of the DC power converted by the converting part into the second predetermined voltage, and transforms a voltage of the DC power input to the first input-output part into a third predetermined voltage. The converting part converts the DC power transformed into the third predetermined voltage by the voltage-transforming part into AC power.

DESCRIPTION OF THE EMBODIMENTS

According to an embodiment of the disclosure, a power storage power conditioner is provided. The power storage power condition includes an input part, a voltage-transforming part, a first input-output part, a converting part, and a second input-output part. Direct current (DC) power of a first predetermined voltage is input to the input part. The voltage-transforming part transforms the first predetermined voltage of the DC power input to the input part into a second predetermined voltage. The first input-output part outputs the DC power transformed into the second predetermined voltage to a battery unit, and inputs DC power from the battery unit. The converting part converts the DC power input to the input part into alternating current (AC) power. The second input-output part outputs the AC power to a power system or a load, and receives AC power from the power system. The converting part converts the AC power input to the second input-output part into DC power. The voltage-transforming part transforms a voltage of the DC power converted by the converting part into the second predetermined voltage, and transforms a voltage of the DC power input to the first input-output part into a third predetermined voltage. The converting part converts the DC power transformed into the third predetermined voltage by the voltage-transforming part into AC power.

The converting part of the power storage power conditioner converts the DC power input to the power storage power conditioner from a voltage-transforming device into AC power. Therefore, the voltage-transforming device does not have a converting device that converts DC power into AC power. By not providing a converting device in the voltage-transforming device, the size and the cost of the voltage-transforming device are reduced, and the size and the cost of the power storage system can be reduced, whereas the conversion efficiency of the power storage system can be higher.

According to another embodiment of the disclosure, the power storage power conditioner includes a controller which controls the voltage-transforming part and the converting part. When a voltage-transforming device transforming a voltage of DC power input from a power generating device into the first predetermined voltage and outputting the DC power is not connected to the power storage power conditioner, the control part controls the voltage-transforming part and the converting part independently of the voltage-transforming device. When the voltage-transforming device is connected to the power storage power conditioner, the control part controls the voltage-transforming part and the converting part according to the DC power input to the input part.

According to another embodiment of the disclosure, the power storage power condition includes a communicating part communicating with the voltage-transforming device. The control part determines whether communication is established between the communicating part and the voltage-transforming device. When communication is not established between the communicating part and the voltage-transforming device, the control part determines that the voltage-transforming device is not connected to the power storage power conditioner. When communication is established between the communicating part and the voltage-transforming device, the control part determines that the voltage-transforming device is connected to the power storage power conditioner.

According to the embodiments of the disclosure, it is possible to reduce the cost and the size and make the conversion efficiency of the power storage system higher.

Hereinafter, the embodiments will be described with reference to the drawings. The following embodiments merely serve an aspect of the disclosure and do not limit the technical scope of the disclosure.

Application Example

Figure 1:
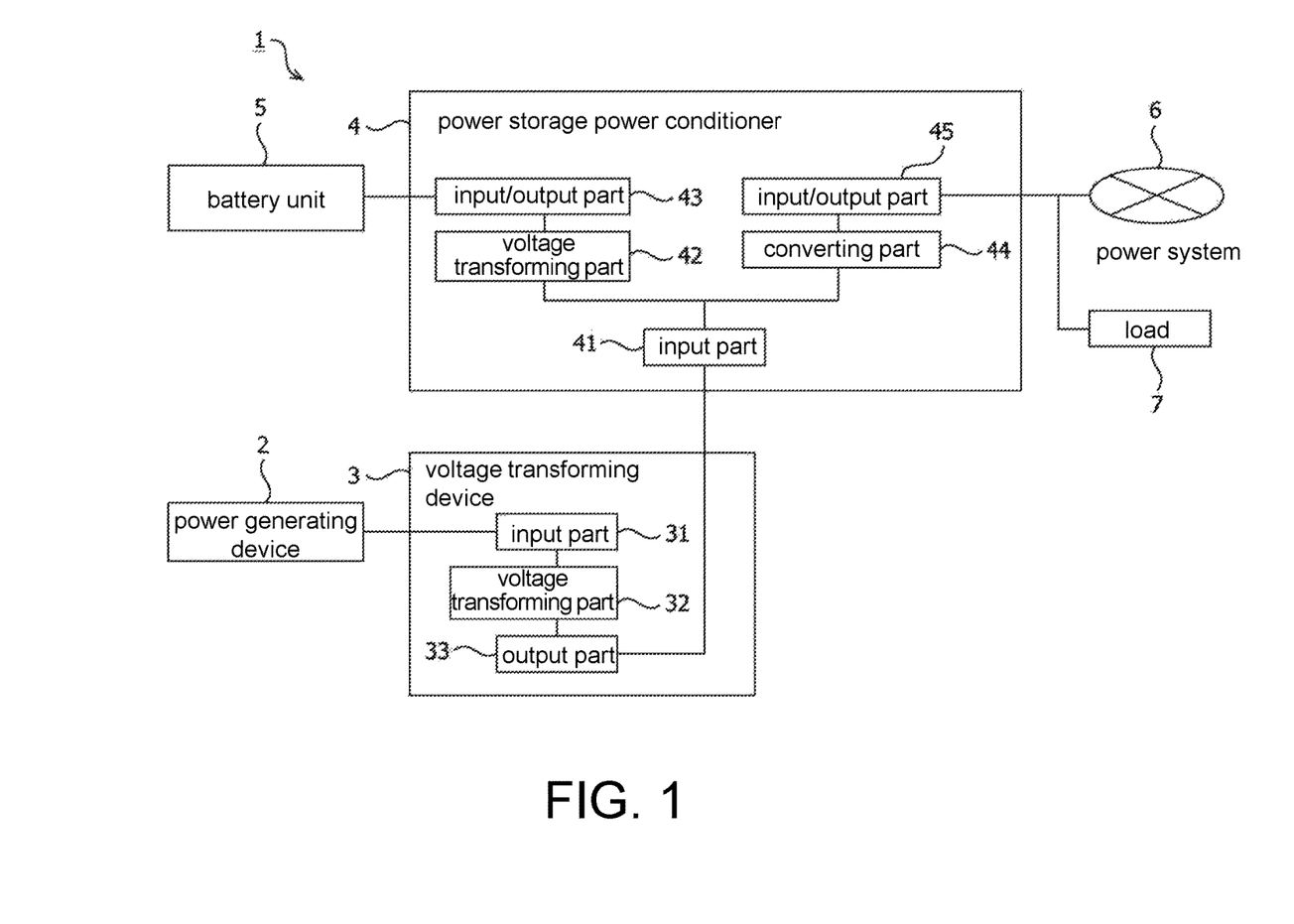
FIG. 1 is a circuit block diagram showing an example of a power storage system according to an embodiment.

FIG. 1 is a diagram showing an example of a power storage system 1 according to the embodiment. The power storage system 1 includes a power generating device 2, a voltage-transforming device 3, a power storage power conditioner 4, and a battery unit 5. The power generating device 2 is a device capable of generating electric power, and is, for example, a photovoltaic (PV) unit, a fuel cell (FC) unit, a wind power generating unit, etc. The power generating device 2 inputs the generated DC power to the voltage-transforming device 3. The voltage-transforming device 3 has an input part 31, a voltage-transforming part 32, and an output part 33. The DC power output from the power generating device 2 is input to the input part 31. The input part 31 is an example of the input part of the voltage-transforming device. The voltage-transforming part 32 transforms the voltage of the DC power input to the input part 31 into a first predetermined voltage. The voltage-transforming part 32 is, for example, a non-insulated DC/DC converter or an insulated DC/DC converter. The output part 33 inputs the DC power transformed into the first predetermined voltage to the power storage power conditioner 4. The power storage system 1 may include a plurality of power generating devices 2. The voltage-transforming device 3 may include a plurality of input parts 31, a plurality of voltage-transforming parts 32, and a plurality of output parts 33 respectively connected to the power generating devices 2.

The power storage power conditioner 4 has an input part 41, a voltage-transforming part 42, an input-output part 43, a converting part 44, and an input-output part 45. The DC power of the first predetermined voltage output from the output part 33 of the voltage-transforming device 3 is input to the input part 41. The input part 41 is an example of the input part of the power storage power conditioner. The voltage-transforming part 42 transforms the first predetermined voltage of the DC power input to the input part 41 into a second predetermined voltage. The voltage-transforming part 42 is, for example, a non-insulated DC/DC converter or an insulated DC/DC converter. The input-output part 43 inputs the DC power transformed into the second predetermined voltage to the battery unit 5. Also, DC power output from the battery unit 5 is input to the input-output part 43. The input-output part 43 is an example of the first input-output part. The voltage-transforming part 42 transforms the voltage of the DC power input to the input-output part 43 into the third predetermined voltage and outputs the DC power. The converting part 44 converts the DC power input to the input part 41 into AC power. The converting part 44 is, for example, a DC/AC inverter. The converting part 44 converts the DC power output from the voltage-transforming part 42 into AC power. The input-output part 45 outputs the AC power to a power system 6 or a load 7. The input-output part 45 is an example of the second input-output part. Also, the AC power output from the power system 6 is input to the input-output part 45. The converting part 44 converts the AC power input to the input-output part 45 into DC power and outputs the DC power. The voltage-transforming part 42 transforms the voltage of the DC power output from the converting part 44 into the second predetermined voltage.

The battery unit 5 is a chargeable/dischargeable secondary battery, and, for example, a lithium ion battery or various other secondary batteries can be applied. The first predetermined voltage and the third predetermined voltage are voltages suitable for outputting AC power to the power system 6 or the load 7. The second predetermined voltage is a voltage suitable for outputting DC power to the battery unit 5. The first predetermined voltage and the second predetermined voltage are at different values. The first predetermined voltage and the third predetermined voltage may be at the same value or different values. The converting part 44 of the power storage power conditioner 4 converts the DC power input from the voltage-transforming device 3 to the power storage power conditioner 4 into AC power. Therefore, the voltage-transforming device 3 does not have a DC/AC inverter that converts DC power into AC power. Thus, according to the power storage system 1, by not providing the DC/AC inverter in the voltage-transforming device 3, the size and the cost of the voltage-transforming device 3 are reduced, and therefore the size and the cost of the power storage system 1 can be reduced, whereas the conversion efficiency of the power storage system 1 can be higher.

Examples

Figure 2:
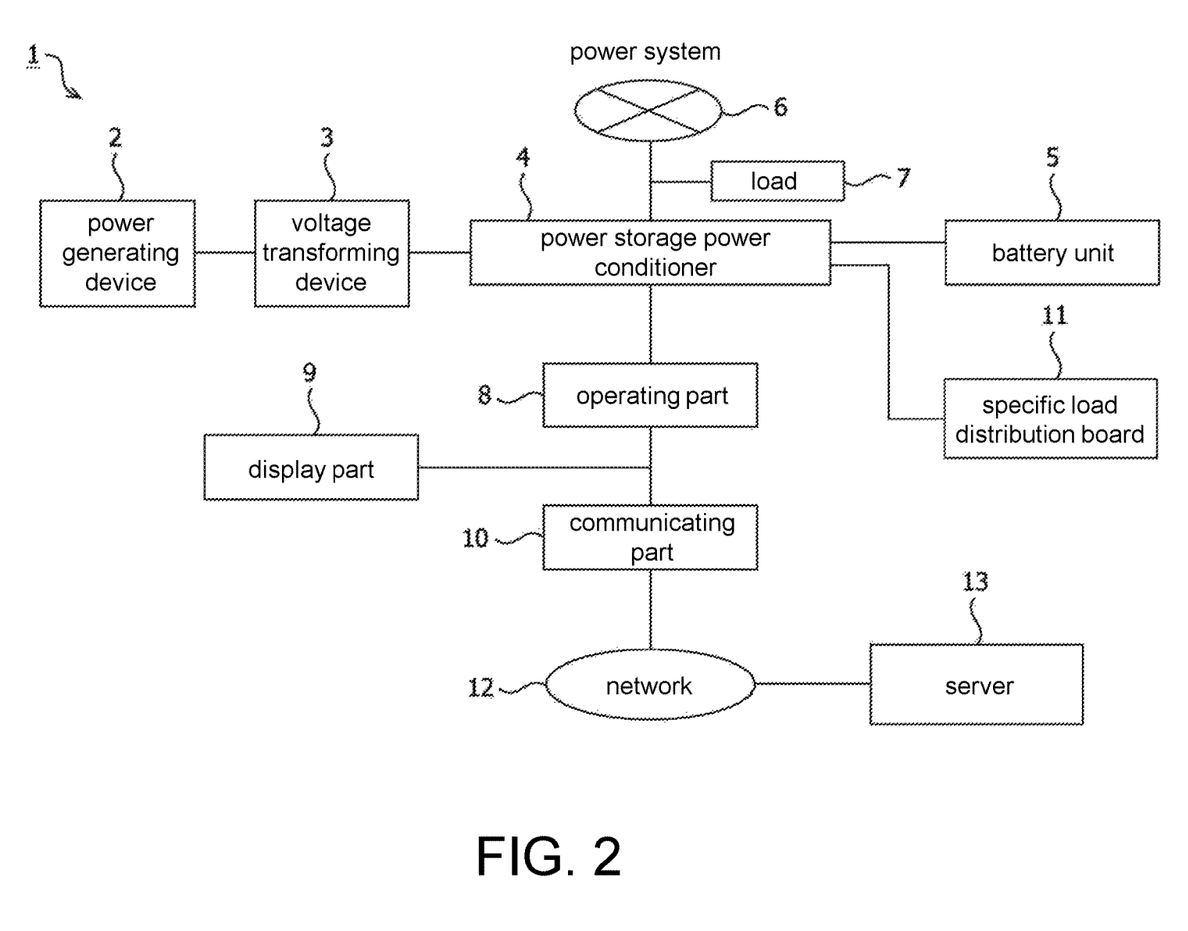
FIG. 2 is a circuit block diagram showing an example of an overall configuration of a power storage system according to an embodiment.

FIG. 2 is a diagram showing an example of the overall configuration of the power storage system 1 according to the embodiment. The power storage system 1 includes the power generating device 2, the voltage-transforming device 3, the power storage power conditioner 4, the battery unit 5, an operating part 8, a display part 9, a communicating part 10 and a specific load distribution board 11. The power generating device 2 is a device capable of generating electric power, such as a PV unit, an FC unit, a wind power generating unit, etc. The power generating device 2 may also have a plurality of PV units, a plurality of FC units, and a plurality of wind power generating units, etc. The power generating device 2 inputs the generated DC power to the voltage-transforming device 3. The power generating device 2 and the voltage-transforming device 3 are connected to each other by a cable or the like. The voltage-transforming device 3 has a non-insulated DC/DC converter or an insulated DC/DC converter. The voltage-transforming device 3 may also include a plurality of DC/DC converters. The voltage-transforming device 3 transforms the voltage of the DC power input from the power generating device 2 and inputs the transformed DC power to the power storage power conditioner 4. The voltage-transforming device 3 and the power storage power conditioner 4 are connected to each other by a cable or the like. The voltage-transforming device 3 is detachable from the power storage power conditioner 4. Even if the voltage-transforming device 3 is not attached to the power storage power conditioner 4, the power storage power conditioner 4 can operate independently. In the example of FIG. 2, the number of the voltage-transforming device 3 is one, but the disclosure is not limited to the example of FIG. 2. There may be a plurality of voltage-transforming devices 3, and it is possible to increase or decrease the number of the voltage-transforming devices 3.

The power storage power conditioner 4 has a non-insulated or insulated DC/DC converter and a DC/AC inverter. The power storage power conditioner 4 transforms the voltage of the DC power input from the voltage-transforming device 3 and inputs the transformed DC power to the battery unit 5. The battery unit 5 is a chargeable/dischargeable secondary battery, and, for example, a lithium ion battery or various other secondary batteries can be applied. By inputting the DC power from the power storage power conditioner 4 to the battery unit 5, the battery unit 5 is charged. With the battery unit 5 discharging, DC power is input from the battery unit 5 to the power storage power conditioner 4. The power storage power conditioner 4 converts the DC power input from the battery unit 5 into AC power and outputs the AC power to the power system 6 or the load 7.

In addition, the power storage power conditioner 4 transforms the voltage of the DC power input from the voltage-transforming device 3, and converts the transformed DC power into AC power and outputs the AC power to the power system 6 or the load 7. The power storage power conditioner 4 converts AC power input from the power system 6 into DC power, transforms the voltage of the DC power, and inputs the transformed DC power to the battery unit 5.

The operating part 8 is a remote controller that inputs a command signal to the power storage power conditioner 4 and operates the power storage power conditioner 4. The operating part 8 may also include an input device, such as a keyboard, a mouse, a keypad, an operation button, etc. The operating part 8 may have a home energy management system (HEMS) controller. The HEMS is a system that manages household power consumption. VPP is a system that collectively manages a plurality of small-scale power generation facilities through a network. The display part 9 displays various kinds of information. The display part 9 is, for example, a cathode ray tube (CRT) display, a liquid crystal display, a plasma display, an organic electro luminescence (EL) display, etc. The communicating part 10 is an interface for communicating with a server 13 connected to a network 12. The communicating part 10 includes, for example, a router and a modem. The network 12 includes, for example, a public network such as the Internet and a local area network (LAN). By providing the specific load distribution board 11, power can be automatically supplied from the power generating device 2 and the battery unit 5 to the electric product (the specified load) connected to the specific load distribution board 11 at the time of power failure. All of the components forming the power storage system 1 shown in FIG. 2 are not essential, and the components forming the power storage system 1 may be added or removed appropriately on the basis of implementing the power storage system 1.

Figure 3:
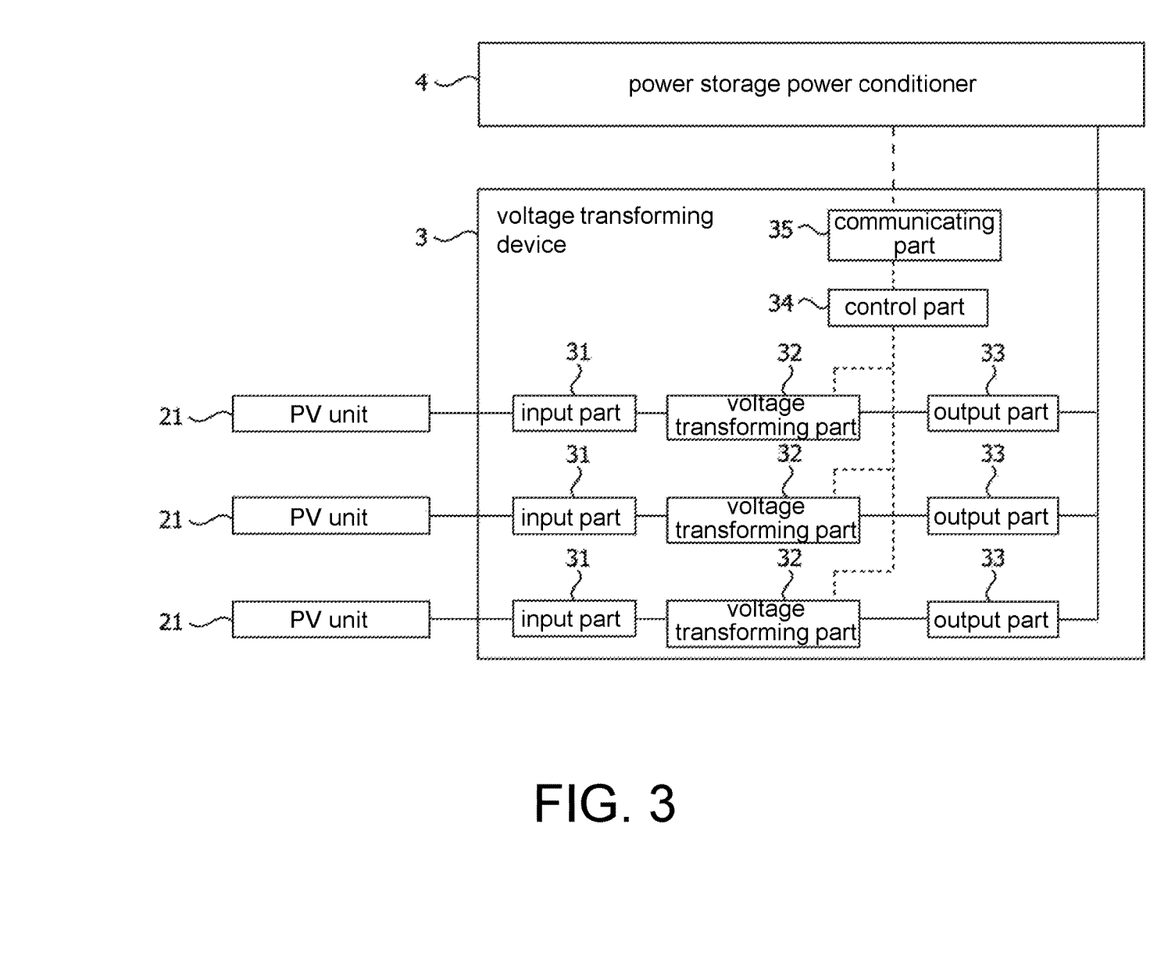
FIG. 3 is a circuit block diagram showing an example of a voltage-transforming device according to an embodiment.

FIG. 3 is a diagram showing an example of the voltage-transforming device 3 according to the embodiment. In the example of FIG. 3, a plurality of PV units 21 are connected to the voltage-transforming device 3. In place of the PV units 21, a plurality of FC units, a plurality of wind power generating units, etc. may be connected to the voltage-transforming device 3, and the disclosure is not limited to the example of FIG. 3. The voltage-transforming device 3 has a plurality of input parts 31, a plurality of voltage-transforming parts 32, a plurality of output part 33, a control part 34, and a communicating part 35. A common output part 33 may be adopted in place of the output part 33. The input part 31 has a connection terminal serving for connection with the PV unit 21. The DC power output from the PV unit 21 is input to the input part 31. The voltage-transforming part 32 is a transforming circuit which transforms (boosts or bucks) the voltage of the DC power. The voltage-transforming part 32 is, for example, a non-insulated DC/DC converter or an insulated DC/DC converter. The voltage-transforming part 32 transforms the voltage of the DC power input to the input part 31 into the first predetermined voltage. The first predetermined voltage is, for example, at a greater value of a value obtained by adding 10 V to the voltage of the DC power output from the PV unit 21 and a value obtained by multiplying the peak value of the system voltage of the power system 6 by a predetermined coefficient. When the FC unit or the wind power generating unit is connected to the voltage-transforming device 3, the value of the first predetermined voltage may be appropriately changed.

The output parts 33 have connection terminals serving for connection with the power storage power conditioner 4. The output parts 33 input the DC power transformed into the first predetermined voltage to the power storage power conditioner 4. The respective PV units 21 and the respective input parts 31 are connected to each other. The respective input parts 31 and the respective voltage-transforming parts 32 are connected to each other. The respective voltage-transforming parts 32 and the respective output parts 33 are connected to each other. The output parts 33 are connected to the input part 41 of the power storage power conditioner 4. The PV units 21 can be detached from the voltage-transforming device 3. The PV units 21 may be removed and a plurality of FC units, a plurality of wind power generating units, etc. may be connected to the voltage-transforming device 3.

The control part 34 controls the voltage-transforming parts 32. The control part 34 includes a processor such as a central processing unit (CPU), a micro-processing unit (MPU), etc., and a memory such as a random access memory (RAM), a read only memory (ROM), etc. The control part 34 may be constituted by one CPU or one MPU, or a combination of a plurality of CPUs and a plurality of MPUs. The CPU and the MPU are not limited to a single processor but may be in a multiprocessor configuration. The control part 34 executes various processes in accordance with the executable developed computer program. The communicating part 35 communicates with the power storage power conditioner 4 via wired or wireless connection. The communicating part 35 sends various kinds of information to the power storage power conditioner 4 and receives various kinds of information from the power storage power conditioner 4. The information received from the power storage power conditioner 4 is transmitted to the control part 34.

The communicating part 35 receives a control signal from the power storage power conditioner 4. When receiving the control signal, the communicating part 35 sends a response signal to the power storage power conditioner 4. The control signal includes at least one of an operation start command, an operation stop command, and an output start command. Based on the control signal, the control part 34 controls to start the operation, stop the operation, and start the output of the voltage-transforming part 32. The output start command includes a predetermined voltage value. The control part 34 controls the voltage-transforming operation of the voltage-transforming part 32 based on the predetermined voltage value included in the output start command. Under the control of the control part 34, the voltage-transforming part 32 transforms the voltage of the DC power input to the input part 31 to the first predetermined voltage. The control part 34 may collectively control the voltage-transforming parts 32 or independently control the voltage-transforming parts 32. For example, the control part 34 may also control the voltage-transforming parts 32, so that the voltage-transforming parts 32 start operating at the same time. For example, the control part 34 may also control the voltage-transforming parts 32, such that some of the voltage-transforming parts 32 start operating and some other of the voltage-transforming parts 32 stop operating. The output parts 33 inputs the DC power transformed into the first predetermined voltage into the power storage power conditioner 4.

Figure 4:
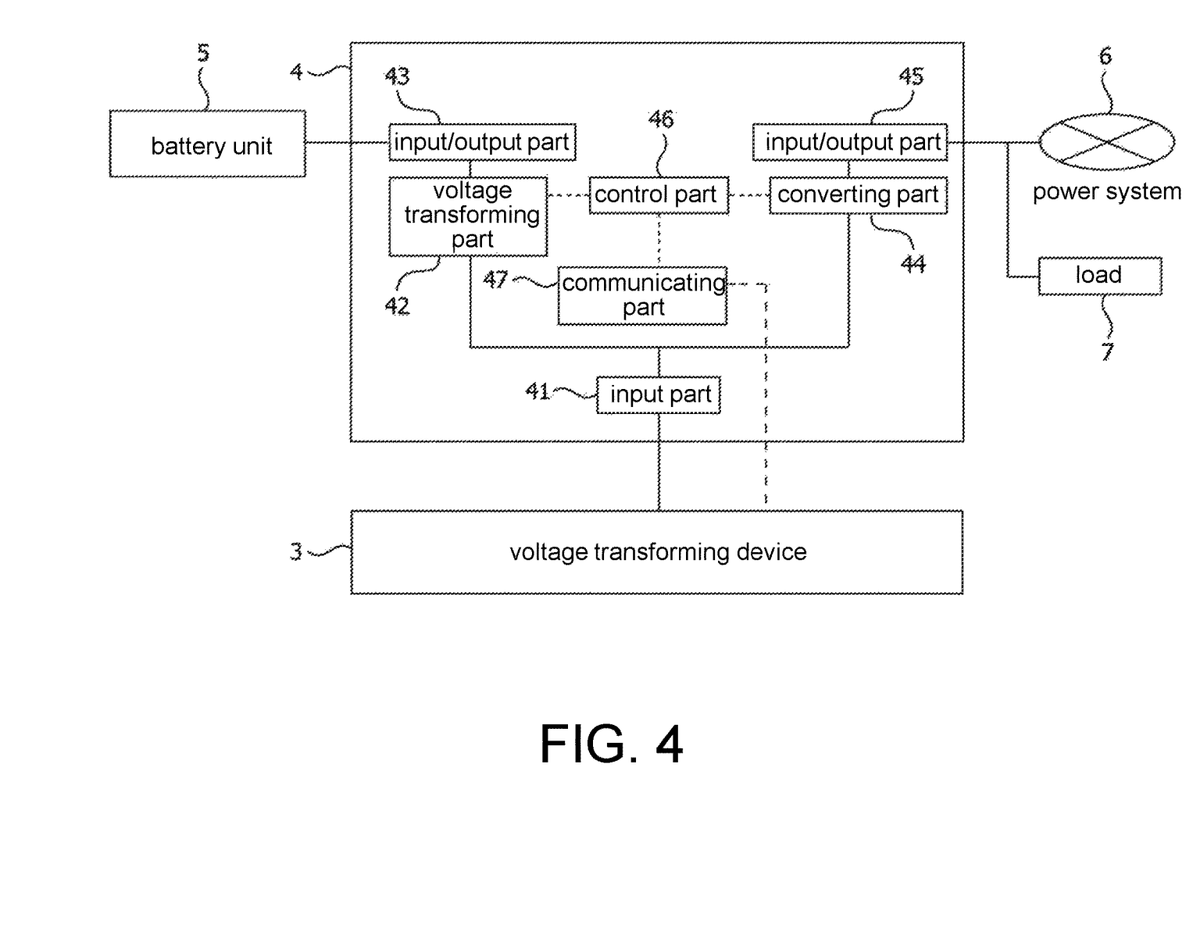
FIG. 4 is a circuit block diagram showing an example of a power storage power conditioner according to an embodiment.

FIG. 4 is a diagram showing an example of the power storage power conditioner 4 according to the embodiment. The power storage power conditioner 4 has the input part 41, the voltage-transforming part 42, the input-output part 43, the converting part 44, the input-output part 45, a control part 46, and a communicating part 47. The input part 41 has a connection terminal serving for connection with the voltage-transforming device 3. The voltage-transforming part 42 is a transforming circuit which transforms the voltage of DC power. The voltage-transforming part 42 is, for example, a non-insulated DC/DC converter or an insulated DC/DC converter. The input-output part 43 has a connection terminal serving for connection with the battery unit 5. The converting part 44 is a circuit that converts DC power into AC power or converts AC power into DC power. The converting part 44 is, for example, a DC/AC inverter. The input-output part 45 has a terminal serving for connection with a distribution board (not shown). The distribution board is located between the power storage power conditioner 4 and the power system 6 as well as the load 7. The power storage power conditioner 4 may have a plurality of input parts 41, and a plurality of voltage-transforming devices 3 may be connected to the power storage power conditioner 4.

The control part 46 controls the voltage-transforming part 42 and the converting part 44. The control part 46 includes a processor such as a CPU, an MPU, etc., and a memory such as a RAM, a ROM, etc. The control part 46 may be constituted by one CPU or MPU, or a combination of a plurality of CPUs and a plurality of MPUs. The CPU and the MPU are not limited to a single processor but may be in a multiprocessor configuration. The control part 46 executes various processes in accordance with an executable developed computer program in the memory. The communicating part 47 communicates with the voltage-transforming device 3 via wired or wireless connection. The communicating part 47 transmits various kinds of information to the voltage-transforming device 3, and receives various kinds of information from the voltage-transforming device 3. The information received from the voltage-transforming device 3 is transmitted to the control part 46. The communicating part 47 transmits a control signal which includes at least one of the operation start command, the operation stop command, and the output start command to the voltage-transforming device 3. The output start command includes a predetermined voltage value. The communicating part 47 receives a response signal from the voltage-transforming device 3.

The control part 46 controls the operation and the output of the voltage-transforming part 42 and controls the operation and the output of the converting part 44.

<First Control>

The first control refers to the control when DC power is input to the input part 41. Under the control of the control part 46, the voltage-transforming part 42 transforms the first predetermined voltage of the DC power input to the input part 41 to the second predetermined voltage and outputs the DC power. The input-output part 43 inputs the DC power transformed into the second predetermined voltage to the battery unit 5. By inputting the DC power to the battery unit 5, the battery unit 5 is charged.

<Second Control>

The second control refers to the control when DC power is input to the input part 41. Under the control of the control part 46, the converting part 44 converts the DC power input to the input part 41 into AC power and outputs the AC power. The input-output part 45 outputs the AC power to the power system 6 or the load 7.

<Third Control>

The third control refers to the control when DC power is input to the input-output part 43. With the battery unit 5 discharging, DC power is input from the battery unit 5 to the input-output part 43. Under the control of the control part 46, the voltage-transforming part 42 transforms the voltage of the DC power input to the input-output part 43 into the third predetermined voltage and outputs the DC power. Under the control of the control part 46, the converting part 44 converts the DC power output from the voltage-transforming part 42 into AC power and outputs the AC power. The input-output part 45 outputs the AC power to the power system 6 or the load 7. The third predetermined voltage is, for example, at a value obtained by multiplying the peak value of the system voltage of the power system 6 by a predetermined coefficient. If the first predetermined voltage is at a value obtained by multiplying the peak value of the system voltage of the power system 6 by a predetermined coefficient, the first predetermined voltage and the third predetermined voltage are at the same value. If the first predetermined voltage is at a value obtained by adding 10 V to the voltage of the DC power output from the PV unit 21, the first predetermined voltage and the third predetermined voltage are different from each other.

<Fourth Control>

The fourth control refers to the control when AC power is input to the input-output part 45 from the power system 6. Under the control of the control part 46, the converting part 44 converts the AC power input to the input-output part 45 into DC power, and outputs the DC power. Under the control of the control part 46, the voltage-transforming part 42 transforms the voltage of the DC power output from the converting part 44 into the second predetermined voltage, and outputs the DC power. The input-output part 43 inputs the DC power transformed into the second predetermined voltage into the battery unit 5. By inputting the DC power to the battery unit 5, the battery unit 5 is charged.

Depending on whether a power failure occurs, an interconnected operation mode or an autonomous operation mode is selected to serve as the operation mode of the power storage power conditioner 4. In addition, the operation mode, such as the interconnected operation mode or the autonomous operation mode, of the power storage power conditioner 4 may also be selected by the user. The operation mode of the power storage power conditioner 4 may also be selected by using the operating part 8. The power storage power conditioner 4 may also switch the operation mode of the power storage power conditioner 4 by receiving the input from the operating part 8.

The case where the interconnected operation mode is selected to serve as the operation mode of the power storage power conditioner 4 will be described. In the following, it is assumed that the voltage-transforming device 3 receives a control signal including the operation start command of the voltage-transforming part 32 and the output start command of the voltage-transforming part 32, and that the output of the voltage-transforming part 32 is started. The control part 46 determines whether DC power is input to the input part 41. If the DC power is not input to the input part 41 (the input power=0 kW), the control part 46 transmits a control signal including the operation stop command of the voltage-transforming part 32 to the voltage-transforming device 3 via the communicating part 47. In such a case, the control part 34 of the voltage-transforming device 3 stops the operation of the voltage-transforming part 32 based on the operation stop command of the voltage-transforming part 32. Depending on the charging state of the battery unit 5, the battery unit 5 may be charged or discharged. If DC power is not input to the input part 41, the battery unit 5 may also be charged by using the DC power converted from the AC power input to the input-output part 45.

If the interconnected operation mode is selected and DC power is input to the input part 41, the control part 46 determines whether the DC power input to the input part 41 is not greater than the rated capacity of the power storage power conditioner 4. If the DC power input to the input part 41 is not greater than the rated capacity of the power storage power conditioner 4, the output of the converting part 44 is started and AC power is output from the input-output part 45 to the power system 6 or the load 7. Also, if the DC power input to the input part 41 is not greater than the rated capacity of the power storage power conditioner 4, the output of the converting part 44 may also be started, and the AC power may be output from the input-output part 45 to the power system 6 and the load 7. Depending on the charging state of the battery unit 5, the battery unit 5 may be charged or discharged. If the DC power input to the input part 41 is not greater than the rated capacity of the power storage power conditioner 4, the battery unit 5 may be charged by using the DC power input to the input part 41 and the DC power converted from the AC power input to the input-output part 45.

If the interconnected operation mode is selected and the DC power input to the input part 41 is greater than the rated capacity of the power storage power conditioner 4, the outputs of the voltage-transforming part 42 and the converting part 44 are started. As a result, DC power is output from the input-output part 43 to the battery unit 5, and AC power is output from the input-output part 45 to the power system 6 or the load 7. Therefore, by using the DC power input to the input part 41, the battery unit 5 is charged. Also, the outputs of the voltage-transforming part 42 and the converting part 44 may also be started, and DC power may be output from the input-output part 43 to the battery unit 5 and AC power may be output from the input-output part 45 to the power system 6 and the load 7.

The case where the autonomous operation mode is selected to serve as the operation mode of the power storage power conditioner 4 will be described. In the following, it is assumed that the voltage-transforming device 3 receives a control signal including the operation start command of the voltage-transforming part 32 and the output start command of the voltage-transforming part 32, and that the output of the voltage-transforming part 32 is started. The control part 46 determines whether DC power is input to the input part 41. If DC power is not input to the input part 41 (the input power=0 kW), the control part 46 transmits a control signal including the operation stop command of the voltage-transforming part 32 to the voltage-transforming device 3 via the communicating part 47. In such a case, the control part 34 of the voltage-transforming device 3 stops the operation of the voltage-transforming part 32 based on the operation stop command of the voltage-transforming part 32.

If the autonomous operation mode is selected and DC power is input to the input part 41, the control part 46 determines whether the DC power input to the input part 41 is not greater than the rated capacity of the power storage power conditioner 4. If the DC power input to the input part 41 is not greater than the rated capacity of the power storage power conditioner 4, the output of the converting part 44 is started and AC power is output from the input-output part 45 to the load 7. Also, if the DC power input to the input part 41 is not greater than the rated capacity of the power storage power conditioner 4, the output of the converting part 44 may be started, and AC power may be output to a specific load in the load 7 from the input-output part 45. Depending on the charging state of the battery unit 5, the battery unit 5 may be charged or discharged.

If the autonomous mode is selected and the DC power input to the input part 41 is greater than the rated capacity of the power storage power conditioner 4, the output of the converting part 44 is started, and AC power is output from the input-output part 45 to the load 7. Also, if the DC power input to the input part 41 is greater than the rated capacity of the power storage power conditioner 4, the output of the converting part 44 may be started, and AC power may be output to a specific load in the load 7 from the input-output part 45. Depending on the charging state of the battery unit 5, the battery unit 5 may be charged or discharged.

The control mode of the power storage power conditioner 4 is automatically switched depending on whether the voltage-transforming device 3 is connected to the power storage power conditioner 4. When the voltage-transforming device 3 is not connected to the power storage power conditioner 4, the control mode of the power storage power conditioner 4 is switched to the power storage only mode (the first control mode). When the voltage-transforming device 3 is connected to the power storage power conditioner 4, the control mode of the power storage power conditioner 4 is switched to the hybrid mode (the second control mode). When the control mode of the power storage power conditioner 4 is switched to the power storage only mode, the control part 46 controls the voltage-transforming part 42 and the converting part 44 independently of the voltage-transforming device 3. When the voltage-transforming device 3 is not connected to the power storage power conditioner 4, there is no DC power input from the voltage-transforming device 3 to the power storage power conditioner 4, so the control part 46 controls the voltage-transforming part 42 and the converting part 44 independently of the voltage-transforming device 3. When the control mode of the power storage power conditioner 4 is switched to the hybrid mode, the control part 46 controls the voltage-transforming part 42 and the converting part 44 according to the DC power input to the input part 41. When the voltage-transforming device 3 is connected to the power storage power conditioner 4, DC power may be input from the voltage-transforming device 3 to the power storage power conditioner 4, so the control part 46 controls the voltage-transforming part 42 and the converting part 44 according to the DC power input to the input part 41. Further, the control part 46 may control the voltage-transforming part 42 and the converting part 44 according to the output state of the DC power in the voltage-transforming device 3.

The control part 46 may also determine whether communication is established between the communicating part 47 and the voltage-transforming device 3. For example, if no response signal is provided from the voltage-transforming device 3 within a certain period after the communicating part 47 sends a control signal to the voltage-transforming device 3, the control part 46 determines that communication is not established between the communicating part 47 and the voltage-transforming device 3. For example, if a response signal is provided from the voltage-transforming device 3 within a certain period of time after the communicating part 47 sends a control signal to the voltage-transforming device 3, the control part 46 determines that communication is established between the communicating part 47 and the voltage-transforming device 3. When communication is not established between the communicating part 47 and the voltage-transforming device 3, the control part 46 determines that the voltage-transforming device 3 is not connected to the power storage power conditioner 4. When communication is established between the communicating part 47 and the voltage-transforming device 3, the control part 46 determines that the voltage-transforming device 3 is connected to the power storage power conditioner 4.

The combinations of the interconnected operation mode and the autonomous operation mode as well as the power storage only mode and the hybrid mode will be described. Firstly, the first combination will be described. The first combination is the case where the interconnected operation mode is selected to serve as the operation mode of the power storage power conditioner 4 and the control mode of the power storage power conditioner 4 is switched to the power storage only mode. In the first combination, the control part 46 controls the voltage-transforming part 42 and the converting part 44 so that the battery unit 5 is discharged until the rated capacity of the power storage power conditioner 4 is reached. Information pertaining to discharging of the battery unit 5 is displayed on the display part 9.

The second combination will be described. The second combination is the case where the autonomous operation mode is selected to serve as the operation mode of the power storage power conditioner 4 and the control mode of the power storage power conditioner 4 switched to the power storage only mode. In the second combination, the control part 46 controls the voltage-transforming part 42 and the converting part 44 so that the battery unit 5 is discharged in accordance with the power consumption of the load 7. Information pertaining to discharging of the battery unit 5 is displayed on the display part 9.

The third combination will be described. The third combination is the case where the interconnected operation mode is selected to serve as the operation mode of the power storage power conditioner 4 and the control mode of the power storage power conditioner 4 is switched to the hybrid mode. In the third combination, the control part 46 determines whether the DC power input to the input part 41 is not greater than the rated capacity of the power storage power conditioner 4. If the DC power input to the input part 41 is not greater than the rated capacity of the power storage power conditioner 4, the control part 46 controls the voltage-transforming part 42 and the converting part 44, so that the battery unit 5 is discharged. The display part 9 displays the sum of the DC power input to the input part 41 and the discharged power of the battery unit 5. The display part 9 may also display the DC power input to the input part 41 and the discharged power of the battery unit 5. If the DC power input to the input part 41 is greater than the rated capacity of the power storage power conditioner 4, the control part 46 controls the voltage-transforming part 42 and the converting part 44, so that the battery unit 5 is charged. In the display part 9, the DC power input to the input part 41 and the charged power of the battery unit 5 are displayed.

The fourth combination will be described. The fourth combination is the case where the autonomous operation mode is selected to serve as the operation mode of the power storage power conditioner 4 and the control mode of the power storage power conditioner 4 is switched to the hybrid mode. In the fourth combination, the control part 46 determines whether the DC power input to the input part 41 is less than or equal to the power consumption of the load 7. If the DC power input to the input part 41 is less than or equal to the power consumption of the load 7, the control part 46 controls the voltage-transforming part 42 and the converting part 44, so that the battery unit 5 is discharged. The display part 9 displays the sum of the DC power input to the input part 41 and the discharged power of the battery unit 5. The display part 9 may also display the DC power input to the input part 41 and the discharged power of the battery unit 5. If the DC power input to the input part 41 is greater than the power consumption of the load 7, the control part 46 controls the voltage-transforming part 42 and the converting part 44, so that the battery unit 5 is charged. In the display part 9, the DC power input to the input part 41 and the charged power of the battery unit 5 are displayed.

According to the power storage system 1, the converting part 44 of the power storage power conditioner 4 converts DC power input from the voltage-transforming device 3 to the power storage power conditioner 4 into AC power. Therefore, the voltage-transforming device 3 does not have a DC/AC inverter that converts DC power into AC power. Thus, according to the power storage system 1, by not providing the DC/AC inverter in the voltage-transforming device 3, the size and the cost of the voltage-transforming device 3 are reduced, and the size and the cost of the power storage system 1 can be reduced and the conversion efficiency of the power storage system 1 can be higher.

According to the power storage power conditioner 4, depending on whether the voltage-transforming device 3 is connected to the power storage power conditioner 4, it is possible to automatically switch the control mode of the power storage power conditioner 4. Consequently, it is easy to add the voltage-transforming device 3 to the power storage power conditioner 4.

What is claimed is:

1. A power storage power conditioner, comprising:
   an input part to which direct current (DC) power of a first predetermined voltage is input;
   a voltage-transforming part which transforms the first predetermined voltage of the DC power input to the input part into a second predetermined voltage;
   a first input-output part which outputs the DC power transformed into the second predetermined voltage to a battery unit and inputs DC power from the battery unit;
   a converting part which converts the DC power input to the input part into alternating current (AC) power; and
   a second input-output part which outputs the AC power to a power system or a load and inputs AC power from the power system,
   wherein the converting part converts the AC power input to the second input-output part into DC power,
   the voltage-transforming part transforms a voltage of the DC power converted by the converting part into the second predetermined voltage, and transforms a voltage of the DC power input to the first input-output part into a third predetermined voltage, and
   the converting part converts the DC power transformed into the third predetermined voltage by the voltage-transforming part into AC power.

2. The power storage power conditioner according to claim 1, comprising:
   a control part which controls the voltage-transforming part and the converting part,
   wherein when a voltage-transforming device transforming a voltage of DC power input from a power generating device into the first predetermined voltage and outputting the DC power is not connected to the power storage power conditioner, the control part controls the voltage-transforming part and the converting part independently of the voltage-transforming device, and
   when the voltage-transforming device is connected to the power storage power conditioner, the control part controls the voltage-transforming part and the converting part according to the DC power input to the input part.

3. The power storage power conditioner according to claim 2, comprising:
   a communicating part which communicates with the voltage-transforming device,
   wherein the control part determines whether communication is established between the communicating part and the voltage-transforming device,
   wherein when the communication is not established between the communicating part and the voltage-transforming device, the control part determines that the voltage-transforming device is not connected to the power storage power conditioner, and
   when the communication is established between the communicating part and the voltage-transforming device, the control part determines that the voltage-transforming device is connected to the power storage power conditioner.

* * * * *